_____

United States Patent Office 3,591,637
Patented July 6, 1971

___

3,591,637
BIS[(DIALKYLAMINOMETHYL)HYDROXY-BENZYL]SULFIDES
Francis X. O'Shea, Naugatuck, Conn., and Gordon P. Sage, Charleston, W. Va., assignors to Uniroyal, Inc., New York, N.Y.
No Drawing. Filed Mar. 4, 1968, Ser. No. 709,968
Int. Cl. C07c 87/28
U.S. Cl. 260—570.9         6 Claims

___

ABSTRACT OF THE DISCLOSURE

This invention is concerned with a new series of compounds found to be useful as antioxidants, and their novel method of production. The compounds, described as (dialkylaminomethyl) hydroxy benzyl sulfides are particularly effective in retarding oxidative deterioration.

___

Our invention relates to a new series of compounds which have been proven effective as antioxidants for organic materials, e.g., rubber, plastics, fats, petroleum products and other organic materials normally subject to oxidative deterioration. The compounds of this invention may be represented by the formula:

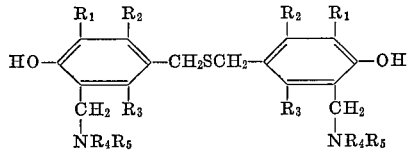

in which $R_1$ is selected from the group consisting of alkyl groups of up to 12 carbon atoms, cycloalkyl groups of from about 5 to about 8 carbon atoms, and an aralkyl group of from about 7 to about 9 carbon atoms, $R_2$ and $R_3$ are selected from the group consisting of hydrgen and methyl and $R_4$ and $R_5$ are selected from the group consisting of alkyl groups of up to 5 carbon atoms each.

This invention is also concerned with the novel method of preparing the aforementioned compounds; said method involving the reaction of a compound of the general formula:

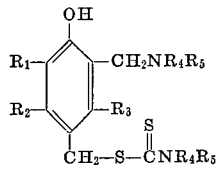

wherein $R_1$, $R_2$, $R_3$, $R_4$ and $R_5$ are as previously described, with an alkali metal sulfide or hydrosulfide in accordance with the following equation:

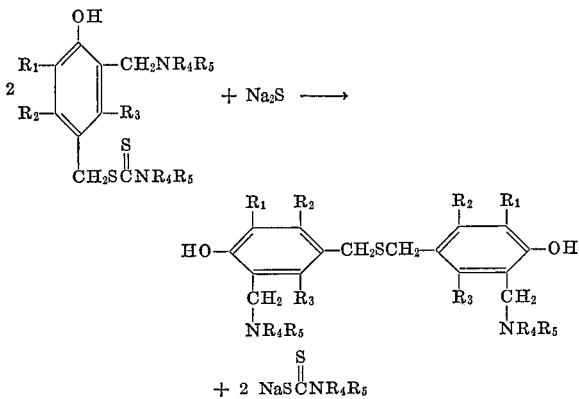

In U.S. Pat. 3,065,275 issued on Nov. 20, 1962 to L. E. Goddard new antioxidant compounds of the following general formula were disclosed:

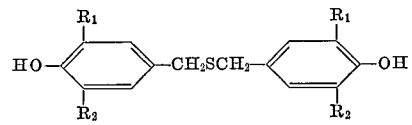

wherein $R_1$ and $R_2$ are alkyl groups.

Our invention differs from the prior art in that the compounds described herein possess a —$CH_2NR_4R_5$ group ($R_4$ and $R_5$ alkyl groups with 1–5 carbon atoms) in a position which is ortho to the phenolic hydroxyl group. Our compounds are therefore functionally different from those described by Goddard. In addition, this functional difference provides the compounds of our invention with a unique and unexpected advantage over the compounds described by the prior art. Thus, the compounds of this invention, when utilized as stabilizers for certain polymers impart an improved color stability to the polymers, particularly after aging. Specifically, our compounds possess superior non-discoloring properties while maintaining high activity, which property will be evidenced by the examples stated below.

The method of preparing the compounds of our invention, as described above, may be carried out in a suitable water miscible solvent such as methanol, ethanol, isopropanol, dioxane, ethylene glycol dimethyl ether, etc., at a temperature from about room temperature to about 100° C.

Preferred solvents for the reaction are methanol, ethanol and isopropanol, while the preferred temperature is in the range of 50° C. to 100° C., the reaction ordinarily being carried out at or near the reflux temperature of the solution. Preferred reaction time is up to 4 hours, however, longer periods may be used but are not necessary, as the reaction generally is completed within 30 minutes or less.

The reaction may also be carried out in a two-phase system, e.g., benzene-water, xylene-water, etc. employing vigorous agitation. Although longer reaction times are generally employed by comparison with a homogeneous solution, this heterogeneous system has the advantage of providing a simplified work-up procedure. In such a two-phase system, the reaction product is soluble in the organic phase which can be readily separated from the aqueous phase containing the alkali metal dialkyl dithiocarbamate. The desired reaction product is finally obtained by removing the solvent from the organic phase.

In some cases, it is desirable to react more than one molar equivalent of the alkali metal sulfide, as this excess often results in an improved yield of final product. It is also of note, that an alkali metal hydrosulfide, such as NaSH may be used in combination with an equimolar amount of an alkali metal hydroxide, such as NaOH as a source of the required alkali metal sulfide.

The intermediate hydroxybenzyl dithiocarbamates are prepared by reacting one molar equivalent of a phenolic compound of the general formula:

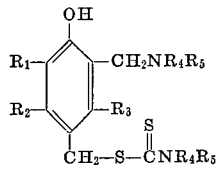

wherein $R_1$, $R_2$ and $R_3$ are as previously described, with at least two molar equivalents of formaldehyde, two molar equivalents of an amine of the formula $R_4R_5NH$ wherein $R_4$ and $R_5$ are as previously described and one molar equivalent of carbon disulfide. The method of preparation of this intermediate is fully described in U.S.

patent application, Ser. No. 462,745 filed June 9, 1965, now U.S. Pat. No. 3,381,026.

The hydrocarbon substituted phenols which may be reacted to produce the intermediate product include o-cresol,
o-ethylphenol,
o-isopropylphenol,
o-sec-butylphenol,
o-t-butylphenol,
o-t-amylphenol,
o-(alpha-methylpentyl)phenol,
o-(alpha-methylheptyl)phenol,
o-(alpha-methylnonyl)phenol,
o-(alpha-methylundecyl)phenol,
o-cyclohexylphenol,
o-benzylphenol,
o-cyclooctylphenol,
o-(alpha-methylbenzyl)phenol,
o-(alpha, alpha-dimethylbenzyl)phenol,
2,3-dimethylphenol,
2,5-dimethylphenol,
2,3,5-trimethylphenol,
6-isopropyl-m-cresol,
2-isopropyl-3,5-dimethylphenol,
6-t-butyl-m-cresol,
2-t-butyl-3,5-dimethylphenol,
6-sec-butyl-m-cresol,
2-sec-butyl-3,5-dimethylphenol,
6-(alpha-methylpentyl)-m-cresol,
2-(alpha-methylpentyl)-3,5-dimethylphenol,
6-t-amyl-m-cresol,
2-t-amyl-3,5-dimethylphenol,
6-(alpha-methylheptyl)-m-cresol,
2-(alpha-methylheptyl)-3,5-dimethylphenol,
6-(alpha-methylnonyl)-m-cresol,
2-(alpha-methylnonyl)-3,5-dimethylphenol,
6-(alpha-methylundecyl)-m-cresol,
2-(alpha-methylundecyl)-3,5-dimethylphenol,
6-t-octyl-m-cresol,
2-t-octyl-3,5-dimethylphenol,
6-cyclohexyl-m-cresol,
2-cyclohexyl-3,5-dimethylphenol,
6-cyclooctyl-m-cresol,
2-cyclooctyl-3,5-dimethylphenol,
6-benzyl-m-cresol,
2-benzyl-3,5-dimethylphenol,
6-(alpha-methylbenzyl)-m-cresol,
2-(alpha-methylbenzyl)-3,5-dimethylphenol,
6-(alpha, alpha-dimethylbenzyl)-m-cresol and
2-(alpha, alpha-dimethylbenzyl)-3,5-dimethylphenol.

The preferred phenols are the o-alkyl phenols wherein the alkyl group has from 1 to 4 carbon atoms. The compounds which best display these features are o-cresol and o-t-butylphenol. Among the secondary amines which may be reacted to form this intermediate are dimethylamine, methylethylamine, diethylamine, dibutylamine and diamylamine, with a preference displayed for dimethylamine.

To illustrate the novel compounds and their methods of preparation, the following examples are given. It should be understood, however, that these examples are merely illustrative and are not to be regarded as limitations to the appended claims since the basic teachings thereof may be varied at will, as should be understood by one skilled in the art.

EXAMPLE 1

The preparation of bis[3-methyl-4-hydroxy-5-(dimethylaminomethyl)-benzyl] sulfide To a suspension of 299 g. (1 mole) of 3-methyl-4-hydroxy-5-(dimethylaminomethyl)benzyl N,N-dimethyldithiocarbamate in 1000 ml. of ethanol was added a solution of 240 g. (1 mole) of $Na_2S \cdot 9H_2O$ in 250 ml. of water. The mixture was heated to reflux for 15 minutes, complete solution taking place. It was then cooled and diluted slowly with 750 ml. of water while stirring. The resulting precipitate of bis[3-methyl-4-hydroxy-5-(dimethylaminomethyl)benzyl] sulfide was filtered off, washed with aqueous ethanol and dried, wt.=153 g. (79%), M.P. 93–95° after recrystallization from ethanol.

*Analysis.*—Calc'd for $C_{22}H_{32}N_2O_2S$ (percent): C, 68.0; H, 8.25; N, 7.22; S, 8.25.

Found (percent): C, 67.97; H, 8.52; N, 7.10; S, 8.53.

EXAMPLE 2

The preparation of bis[3-t-butyl-4-hydroxy-5-(dimethylaminomethyl)-benzyl] sulfide To a suspension of 34 g. (0.1 mole) of 3-t-butyl-4-hydroxy-5-(dimethylaminomethyl)benzyl N,N-dimethyldithiocarbamate in 100 ml. of ethanol was added a solution of 24 g. (0.1 mole) of $Na_2S \cdot 9H_2O$ in 30 ml. of water. The mixture was then heated at 60–70° C. with stirring for one hour. The solution was cooled, diluted with 100 ml. of water and the solid product was filtered off and dried, wt.=21.5 g. (91%), M.P. 94–96° after recrystallization from hexane.

*Analysis.*—Calc'd for $C_{28}N_2O_2S$ (percent): C, 71.2; H, 9.32; N, 5.93; S, 6.79.

Found (percent): C, 71.16; H, 9.58; N, 6.03; S, 6.97.

EXAMPLE 3

The preparation of bis[3-cyclohexyl-4-hydroxy-5-(dimethylaminomethyl)-benzyl] sulfide 3-cyclohexyl-4-hydroxy-5-(dimethylaminomethyl)benzyl N,N-dimethyldithiocarbamate was reacted with sodium sulfide in a manner similar to that described in Example 1 to yield bis[3-cyclohexyl-4-hydroxy-5-(dimethylaminomethyl)-benzyl] sulfide in 71% yield, M.P. 108–109° after recrystallization from ethanol.

*Analysis.*—Calc'd for $C_{32}H_{48}N_2O_2S$ (percent): C, 73.4; H, 9.2; N, 5.4; S, 6.1.

Found (percent): C, 73.24; H, 9.26; N, 5.30; S, 6.24.

EXAMPLE 4

The preparation of bis[2,5-dimethyl-3-(dimethylaminomethyl)-4-hydroxybenzyl] sulfide To a warm solution of 31.2 g. (0.1 mole) of 2,5-dimethyl-3-(dimethylaminomethyl)-4-hydroxybenzyl N,N-dimethyldithiocarbamate in 300 ml. of ethanol and 100 ml. of ethylene glycol dimethyl ether was added a solution of 24 g. (0.1 mole) of $Na_2S \cdot 9H_2O$ in 25 ml. of water. The cloudy solution which resulted was heated for about five minutes and then was filtered. The clear filtrate was diluted with 250 ml. of water and cooled. The resulting precipitate of bis[2,5-dimethyl-3-(dimethylaminomethyl)-4-hydroxybenzyl] sulfide was filtered off, washed with aqueous ethanol and dried, wt.=9 g. (40%), M.P.=114–116°. Further dilution of the filtrate with water gave 7 g. more of product making the total yield 16 g. (72%). A sample recrystallized from ethanol had a melting point of 117–119°.

*Analysis.*—Calc'd for $C_{24}H_{36}N_2O_2S$ (percent): C, 69.2; H, 8.65; N, 6.74; S, 7.70.

Found (percent): C, 69.34; H, 8.83; N, 6.66; S, 7.49.

EXAMPLE 5

The preparation of bis[3-benzyl-4-hydroxy-5-(dimethylaminomethyl)-benzyl]sulfide 3-benzyl-4-hydroxy-5-(dimethylaminomethyl)benzyl N,N-dimethyldithiocarbamate was reacted with sodium sulfide in a manner similar to that described in Example 1 to yield bis[3-benzyl-4-hydroxy-5-(dimethylaminomethyl)benzyl]sulfide, M.P. 135–138° after recrystallization from methanol.

*Analysis.*—Calc'd for $C_{34}H_{40}N_2O_2S$ (percent): S, 5.93. Found (percent): S, 5.65.

EXAMPLE 6

The preparation of bis[2,3-dimethyl-4-hydroxy-5-(dimethylaminomethyl)-benzyl]sulfide 2,3 - dimethyl - 4 - hydroxy - 5 - (dimethylaminomethyl) - benzyl N,N - dimethyldithiocarbamate was reacted with sodium sulfide in a manner similar to that described in Example 1 to yield bis[2,3-dimethyl - 4 - hydroxy-5-(dimethylaminomethyl)-benzyl]sulfide, M.P. 117–118° after recrystallization from ethanol.

*Analysis.*—Calc'd for $C_{24}H_{36}N_2O_2S$ (percent): S, 7.70. Found (percent): S, 7.98.

EXAMPLE 7

The preparation of bis[2-methyl-3-(dimethylaminomethyl)-4-hydroxy-5-t-butylbenzyl]sulfide 2-methyl - 3 - (dimethylaminomethyl) - 4 - hydroxy-5-t-butylbenzyl N,N-dimethyldithiocarbamate was reacted with sodium sulfide in a manner similar to that described in Example 1 to yield bis[2-methyl - 3 - (dimethylaminomethyl) - 4 - hydroxy - 5 - t-butylbenzyl]sulfide in 65% yield, M.P. 166–169° after recrystallization from ethanol.

*Analysis.*—Calc'd for $C_{30}H_{48}N_2O_2S$ (percent): S, 6.40. Found (percent): S, 6.88.

EXAMPLE 8

The preparation of bis[3-isopropyl-4-hydroxy-5-(dimethylaminomethyl)benzyl]sulfide 3-isopropyl - 4 - hydroxy - 5 - (dimethylaminomethyl)-benzyl N,N - dimethyldithiocarbamate was reacted with sodium sulfide in a manner similar to that described in Example 1 to yield bis[3-isopropyl - 4 - hydroxy - 5 - (dimethylaminomethyl)benzyl]sulfide, a viscous oil.

EXAMPLE 9

The preparation of bis[3-sec-butyl-4-hydroxy-5-(dimethylaminomethyl)benzyl]sulfide To a slurry of 34 g. (0.1 mole) of 3-sec-butyl-4-hydroxy - 5 - (dimethylaminomethyl)benzyl N,N - dimethyldithiocarbamate in 100 ml. of ethanol was added 12 g. (0.05 mole) of $Na_2S \cdot 9H_2O$. The mixture was heated at reflux for 15 minutes. The resulting solution was poured into water and the product was extracted with ether. The ether solution was washed with water, dried with anhydrous sodium sulfate and evaporated down to yield bis[3 - sec - butyl - 4 - hydroxy - 5 - (dimethylaminomethyl)benzyl]sulfide as a viscous oil weighing 23 g. (98%).

EXAMPLE 10

The preparation of bis[3-(α-methylundecyl)-4-hydroxy-5-(dimethylaminomethyl)benzyl]sulfide 3 - (α - methylundecyl) - 4 - hydroxy - 5 - (dimethylaminomethyl)benzyl N,N - dimethyldithiocarbamate was reacted with sodium sulfide in a manner similar to that described in Example 9 to yield bis[3 - (α - methylundecyl - 4 - hydroxy - 5 - (dimethylaminomethyl)-benzyl]sulfide, a viscous oil.

EXAMPLE 11

The preparation of bis[3-methyl-4-hydroxy-5-(di-n-butylaminomethyl)benzyl]sulfide 3 - methyl - 4 - hydroxy - 5 - (di-n-butylaminomethyl)-benzyl N,N - di - n - butyldithiocarbamate was reacted with sodium sulfide in a manner similar to that described in Example 9 to yield bis[3 - methyl - 4 - hydroxy-5-(di-n-butylaminomethyl)benzyl]sulfide as a viscous oil in 87% yield.

EXAMPLE 12

This example demonstrates the utility of the compounds of the invention as stabilizers for synthetic rubber.

A commercial SBR 1061 C styrene-butadiene copolymer containing a triaryl phosphite stabilizer was used as the base polymer. The compounds to be evaluated were milled into the polymer so as to provide rubber containing a 1% concentration of additive. The resulting polymer samples were then aged in a circulating air oven at 130° C. for 24 hours. The percent gel in benzene was then determined on the aged samples, high gel content being produced by polymer oxidation.

| Added stabilizer | Color | Gel, percent |
|---|---|---|
| None | Dark brown (resinified) | 54.7 |
| Bis(3-methyl-4-hydroxy-5-t-butylbenzyl)-sulfide. | Yellow brown | 8.3 |
| Bis[3-methyl-4-hydroxy-5-(dimethylaminomethyl)-benzyl]sulfide. | Off-white | 8.0 |

The results illustrate the value of a compound of this invention as a stabilizer, the rubber containing this compound developing far less gel than the rubber with no added stabilizer. The results also show that the compound of this invention is equivalent to the prior art compound in preventing gel development.

The results also demonstrate the value of the chemical of this invention in preventing color development in the polymer and illlustrate its superiority over the prior art compound in this respect.

EXAMPLE 13

This example demonstrates the usefulness of the compounds of the invention as stabilizers for polyisoprene.

A commercial cis-polyisoprene cynthetic rubber containing 2,6-di-t-butyl-p-cresol as a stabilizer was used as the base polymer. The polymer was dissolved in benzene so as to provide a 2% polymer solution. An aliquot portion of a benzene solution of the compound to be evaluated was added so as to provide 1% by weight of the additive based upon the weight of polymer in the solution. A thin film of rubber was then deposited on a sodium chloride disk by evaporating 10 drops of the solution on the one inch diameter disk.

The disks were then placed in a 130° C. oven and removed after 30 minutes, one hour and every hour thereafter. At each interval, the infrared spectrum of the polymer film was obtained. Oxidation of the polymer film is evidenced by the appearance of a band at $5.85\mu$ in the spectrum caused by the development of carbonyl groups in the polymer. The time of aging required for the appearance of this band in the spectrum is taken as the break time. The effectiveness of compounds as stabilizers can be evaluated by the length of time they protect the rubber against oxidation as determined by this carbonyl development test.

| Adder stabilizer | Hours to break |
|---|---|
| None | ½ |
| Bis(3 - methyl - 4 - hydroxy - 5 - t-butylbenzyl)-sulfide | 5 |
| Bis[3 - methyl - 4 - hydroxy - 5 - dimethylaminomethyl)benzyl]sulfide | 6 |

Non-discoloring characteristics were determined in this polymer by aging one gram of rubber obtained from the above described polymer solutions at 130° C. for two hours and observing for color formation.

| Added stabilizer | Color |
|---|---|
| None | Colorless (melted down). |
| Bis(3 - methyl - 4 - hydroxy-t-butylbenzyl)sulfide | Yellow. |
| Bis[3 - methyl - 4 - hydroxy-5 - (dimethylaminomethyl)-benzyl]sulfide | Colorless. |

EXAMPLE 14

This example demonstrates the usefulness of the compounds of this invention as stabilizers for cis-polybutadiene rubber.

The compound of this invention was incorporated in the polymer at a 1% concentration by weight. Rubber samples were aged at 100° C. and observed for surface hardening (resinification) which is the result of polymer oxidation.

| Added stabilizer: | Time to resinify (in hours) |
|---|---|
| None | 5 |
| Bis[3-methyl-4-hydroxy - 5 - (dimethylaminomethyl)-benzyl]sulfide | 50 |

EXAMPLE 15

This example demonstrates the usefulness of the compounds of this invention as stabilizers for an ethylene propylene terpolymer.

A hexane solution of a commercial ethylene-propylene-dicyclopentadiene terpolymer containing no stabilizer was used as the base polymer. The compounds were evaluated using the carbonyl development test described in Example 13. The aging temperature was 150° C.

| Added stabilizer: | Hours to break |
|---|---|
| None | 2 |
| Bis[3 - methyl - 4-hydroxy-5-(dimethylaminomethyl)benzyl]sulfide | 7 |
| Bis[3-t-butyl - 4 - hydroxy - 5-(dimethylaminomethyl)benzyl]sulfide | 7 |
| Bis[2,5 - dimethyl - 3 - (dimethylaminomethyl)-4 - hydroxybenzyl]sulfide | 8 |
| Bis[3-cyclohexyl-4 - hydroxy-5-(dimethylaminomethyl)benzyl]sulfide | 10 |
| Bis[2 - methyl - 3 - (dimethylaminomethyl)-4-hydroxy - 5 - t - butylbenzyl]sulfide | 16 |

EXAMPLE 16

This example demonstrates the usefulness of the compounds of this invention as antioxidants for vulcanized natural rubber compounds.

A natural rubber compound was mixed according to the following formulation:

| | |
|---|---|
| Natural rubber | 100.0 |
| FEF carbon black | 40.0 |
| Zinc oxide | 5.0 |
| Stearic acid | .0 |
| Process oil | 5.0 |
| N-cyclohexylbenzothiazyl sulfenamide | 0.6 |
| Sulfur | 2.5 |
| Bis[3 - methyl - 4 - hydroxy-5-(dimethylaminomethyl)benzyl]sulfide | 0 and 2.0 |

The compound was cured at 320° F. for 30 min.
Initial physical properties:

| | No antioxidant | 2.0 parts antioxidant |
|---|---|---|
| 300% modulus, p.s.i. | 1,250 | 1,240 |
| Tensile strength, p.s.i. | 2,820 | 2,600 |
| Elongation, percent | 520 | 520 |

Physical properties after oven aging at 212° F. for 71 hours:

| | No antioxidant | 2.0 parts antioxidant |
|---|---|---|
| 300% modulus, p.s.i. | | 1,380 |
| Tensile strength, p.s.i. | 780 | 1,450 |
| Elongation, percent | 225 | 315 |

EXAMPLE 17

This example demonstrates the usefulness of the compounds of this invention as antioxidants for a peroxide cured SBR compound.

An SBR compound was mixed according to the following formulation:

| | |
|---|---|
| SBR 1502 | 100.0 |
| Kralac AEP | 50.0 |
| Hi Sil 233 | 65.0 |
| Carbowax 4000 | 2.0 |
| Magnesium oxide | 2.0 |
| Di Cup 40C | 4.5 |
| Bis[3 - methyl - 4 - hydroxy - 5-(dimethylaminomethyl)benzyl]sulfide | 0 and 2.0 |

The compound was cured at 345° F. for 5½ min.
Initial physical properties retained after aging for 40 hours at 212° F.

| | No antioxidant | 2.0 parts antioxidant |
|---|---|---|
| Tensile strength retained, percent | 81 | 104 |
| Elongation retained, percent | 33 | 100 |

Having thus described our invention, what we claim and desire to protect by Letters Patent is:

1. A chemical of the formula:

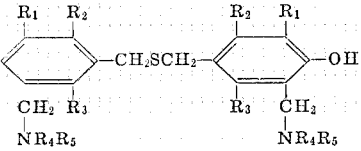

wherein $R_1$ is selected from the group consisting of an alkyl group of from 1 to 12 carbon atoms, a cycloalkyl group of from about 5 to about 8 carbon atoms and an aralkyl group of from about 7 to about 9 carbon atoms, wherein $R_2$ and $R_3$ are selected from the group consisting of hydrogen and methyl and where $R_4$ and $R_5$ are selected from the group consisting of alkyl groups of from about 1 to about 5 carbon atoms.

2. The compound of claim 1 wherein $R_1$ is methyl $R_2$ and $R_3$ are hydrogen, and $R_4$ and $R_5$ are methyl.

3. The compound of claim 1 wherein $R_1$ is cyclohexyl, $R_2$ and $R_3$ are hydrogen, and $R_4$ and $R_5$ are methyl.

4. The compound of claim 1 wherein $R_1$ and $R_2$ are methyl, $R_3$ is hydrogen and $R_4$ and $R_5$ are methyl.

5. The compound of claim 1 wherein $R_1$ is t-butyl, where $R_2$ and $R_3$ are both hydrogen, and $R_4$ and $R_5$ are methyl.

6. The compound of claim 1 wherein $R_1$ is t-butyl, $R_2$ is hydrogen, $R_3$, $R_4$ and $R_5$ are all methyl.

References Cited

UNITED STATES PATENTS

| 3,299,147 | 1/1967 | O'Shea | 260—570.5X |
| 3,310,587 | 3/1967 | O'Shea | 260—570.5X |

ROBERT V. HINES, Primary Examiner

U.S. Cl. X.R.

252—401; 260—45.9, 455, 570, 508, 809